Jan. 4, 1949.     J. B. LITTLE ET AL     2,458,181
SPEED REDUCTION MECHANISM
Filed Sept. 20, 1944     2 Sheets-Sheet 1
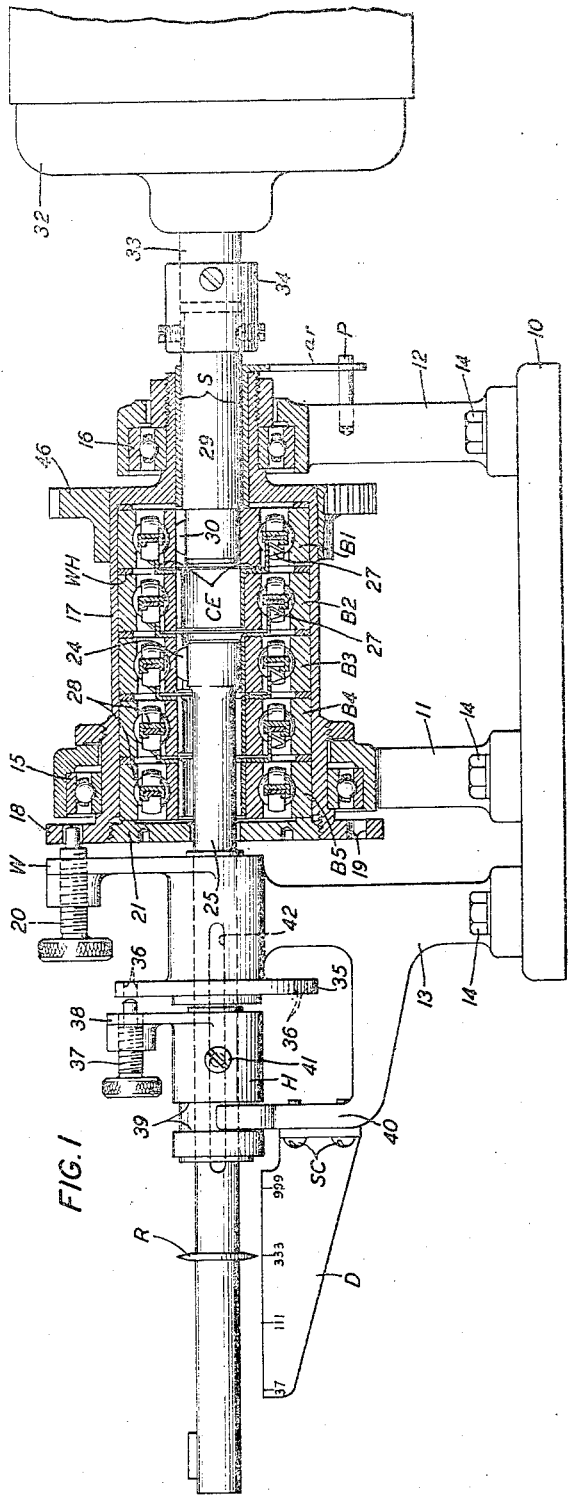
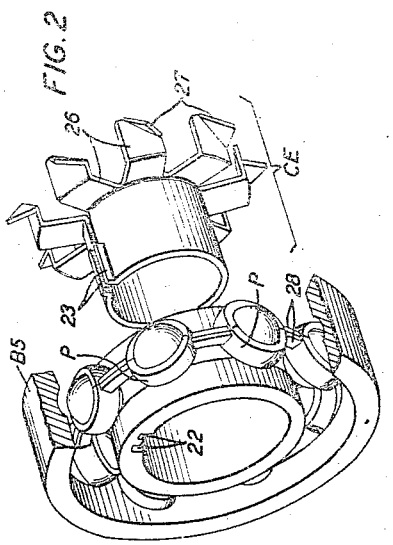
INVENTORS: J. B. LITTLE
W. A. MUNSON
BY J. MacDonald
ATTORNEY Jan. 4, 1949.   J. B. LITTLE ET AL   2,458,181
SPEED REDUCTION MECHANISM
Filed Sept. 20, 1944

INVENTORS: J. B. LITTLE
W. A. MUNSON

Patented Jan. 4, 1949

2,458,181

UNITED STATES PATENT OFFICE 2,458,181

SPEED REDUCTION MECHANISM

John B. Little, Summit, and Wilden A. Munson, Chatham, N. J., assignors to Bell Telephone Laboratories, Incorporated, New York, N. Y., a corporation of New York Application September 20, 1944, Serial No. 554,894

3 Claims. (Cl. 74—263)

This invention relates to speed reduction mechanisms.

The object of this invention is the provision of a speed reduction mechanism in which the relative movement of the elements of one or a plurality of ball bearings is utilized for frictionally driving a power take-off shaft and a power take-off drum at different stages of speed reduction.

In ball bearings, as it is well known, rings are generally used for holding the balls in races formed in concentrically disposed rings, the ball retaining rings being rotated by the planetary movement of the balls due to friction between these balls and the concentric rings at a speed ratio depending upon the difference between the diameters of the ball races in the concentric rings.

According to the construction of the speed reduction mechanism of this invention a drum member is provided for mounting ball bearings in coaxial relation to each other, while coupling elements are provided for operatively connecting the successive ball holding rings of the bearings with the successive inner race rings of these bearings, with provision for rotatably mounting the drum itself on supports secured to a base. A cover member for the drum serves to secure the outer rings of the ball bearings and spacer elements disposed therebetween against rotary movement relative to each other in the drum, while means in the form of key ways in the openings of the inner disposed race rings of the ball bearings engage with means formed with the coupling elements which in turn may be engaged by means carried by a shaft movable longitudinally for operatively connecting the shaft with the inner race rings of the bearings selectively.

A locking element carried by a stationary support which is secured to the base is provided for engaging with a complement locking element carried by the power take-off drum to cause the rotary movement of the power take-off shaft according to the selected speed reduction, while a lock element carried by the power take-off shaft is provided for engaging with a complement lock element carried by the stationary support for locking the power take-off shaft against movement to cause the rotation of the power take-off drum when unlocked in a direction opposite to that imparted to the power take-off shaft but at a stage of speed reduction depending upon the bearing selected by the adjusting movement of the power take-off shaft as indicated by a pointer carried by the shaft movable in registry with numbers printed on a dial.

Other novel features and advantages of the invention will appear from the following description and by the claims appended thereto reference being had to the accompanying drawings in which:

Fig. 1 is a side elevational view shown with a number of operating parts in longitudinal vertical section;

Fig. 2 is a perspective view of one of the ball bearings and one of the couplings, the ball bearing being shown with portions broken away;

Figure 3:
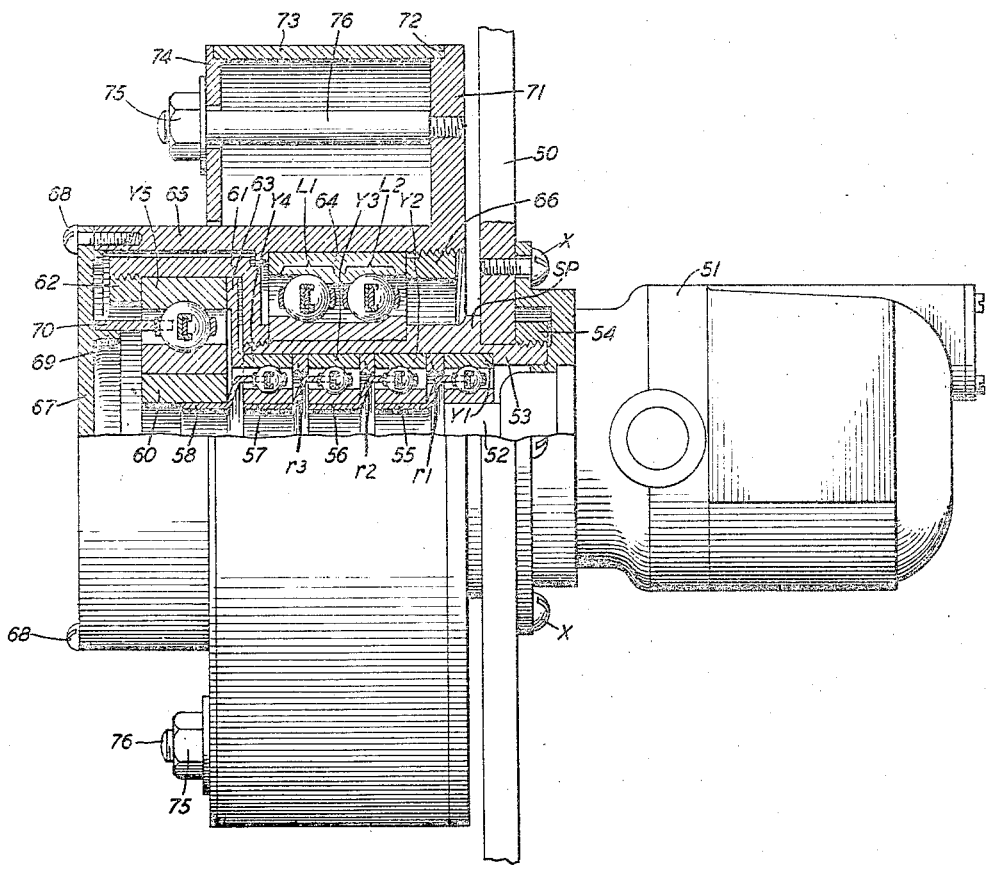
Fig. 3 is a side view of a modification of Fig. 1 shown partly in vertical section.

In the speed reduction mechanism of this invention as shown in Fig. 1, a base 10 is provided for mounting the upright supports 11, 12 and 13 which are secured to the base by a number of similar screws 14. The upright supports 11 and 12 are fitted with ball bearings 15 and 16, respectively, serving for rotatably supporting a power take-off drum element 17 having a lock element in the form of a flange portion 18 at one end thereof provided with a plurality of similarly sized holes 19 for engagement by a cooperating lock element in the form of a thumb screw 20 carried by a projection W formed with the upright support 13, for locking this power take-off drum against rotary movement for causing the rotation of a power take-off shaft as will be hereinafter described in detail.

In the drum 17 as shown in Fig. 1 is mounted a series of ball bearings B1, B2, B3, B4 and B5 which may be of any desired number held in spaced relation to each other by washers as WH while the outer disposed race rings of ball bearings B1, B2, B3, etc. and the rings WH are held collectively against relative rotary movement in the drum by the tightening of a closure in the form of a plug 21 threadedly engaging the open end of drum element 17. The inner disposed race rings of ball bearings B2, B3, etc. are formed with parallelly disposed slots or keyways 22 best seen in Fig. 2 for receiving the key portions 23 formed with the cylindrical portion of coupling elements as CE, the key portions 23 of each coupling element CE in turn forming a keyway to be engaged by a key 24 carried by a power take-off shaft 25 manually movable longitudinally for operatively and selectively engaging with the inner race rings of ball bearings B2, B3, B4 and B5 as will be hereinafter described in detail, the arms 26 of each coupling member CE being formed at their free ends with bent portions as 27 serving as bearing surfaces resting against the corrugations formed by their respective ball retaining rings 28.

A driving shaft 29 is journaled in a sleeve S held against frictional movement upon the rotation of this shaft by an arm ar engaging a pin P laterally extending from support 12. The shaft 29 is provided with a key 30 for operatively engaging a keyway in the inner race ring of ball bearing B1 for rotating this ring upon the operation of a motor 32, the armature shaft 33 of which is connected to the shaft 29 by a coupling sleeve 34.

Support 13 as shown in Fig. 1 is provided with a lock element in the form of a disc portion 35 having a plurality of holes 36 for individual engagement with a lock element in the form of a thumb screw 37 threadedly engaging the free end of an arm 38 which is held against rotary movement on the shaft 25 by a set screw 41 engaging a keyway 42 so as to permit the longitudinal movement of this shaft for connection of the latter selectively relative to the inner race rings of ball bearings B2, B3, B4 and B5, the arm 38 being held in position adjacent the disc 35 upon the longitudinal movement of shaft 25 by a fork-shaped extension 40 of support 13 engaging with a collar 39 at the periphery of a hub H formed with the arm 38.

In the speed reduction mechanism of this invention as shown in Fig. 1 and in its modification shown in Fig. 3 five ball bearings have been chosen for reducing the speed of motor 32 one third at each stage of speed reduction i. e., from 2,997 revolutions per minute to 999 for the first stage of speed reduction, 333 for the second stage, 111 for the third stage and 37 for the fourth stage as imparted to power take-off shaft 25 when the thumb screws 20 and 37 are positioned as indicated in Fig. 1, such speed reduction being indicated by an index in the form of a ridge R carried by shaft 25 in cooperation with marks printed on a dial D secured to the fork-shaped extension 40 of support 13 by a plurality of screws SC.

The conditioning of the speed reduction for operating the power take-off drum 17 and the gear 46 carried thereby is effected by the locking of the shaft 25 against rotation through the engagement of thumb screw 37 with the disc 35 and the disengagement of thumb screw 20 from the flange portion of drum 17. Under this condition the drum 17 is rotated on bearings 15 and 16 in a direction opposite to that imparted to shaft 25 in each stage of speed reduction which in connection with the operation of drum 17 the speed of the motor 32 is reduced in four different stages to 999, 333, 111 and 37 at the ball bearing B4 which due to the locked condition of shaft 25 now in engagement with the inner race ring of bearing B5 prevents the rotation of ball retaining ring 28 of ball bearing B4 and thereby the planetary movement of the balls of this bearing. While causing the rotation of the outer disposed race ring of bearing B4 and the consequent rotation of drum 17 in a direction opposite to that imparted to shaft 25 as above described.

Figure 4:
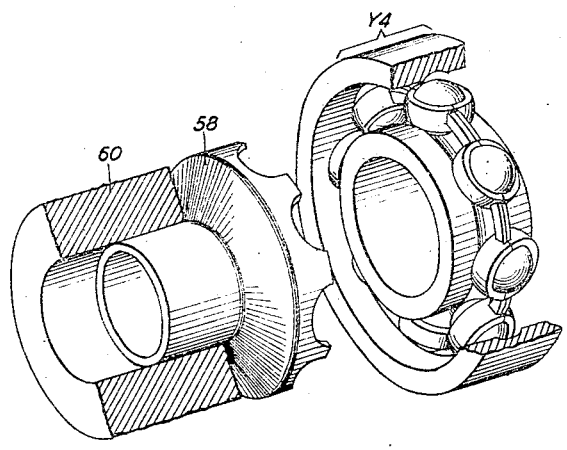
Fig. 4 is a view similar to Fig. 1 showing a modification of the coupling disposed between the ball retaining rings of the bearings and the inner race rings of such bearings.

In the modification of the speed reduction mechanism of this invention as shown in Figs. 3 and 4 a mounting plate 50 is provided for securing as by a number of screws X, a motor 51, while a sleeve 53 is fitted in an opening in the plate 50 in position concentric to the armature shaft 52 of motor 51 and held securely thereon by a nut 54 and a shoulder portion SP formed with the sleeve. The sleeve 53 serves as a casing for housing a plurality of ball bearings Y1, Y2, Y3 and Y4 held in spaced relation to each other by rings r1, r2 and r3, while a coupling element 55 operatively connects the ball retaining ring of ball bearing Y1 with the inner race ring of ball bearing Y2. Another coupling element 56 operatively connects the ball retaining ring of ball bearing Y2 with the inner race ring of ball bearing Y3 and a third coupling element 57 operatively connects the ball retaining ring of bearing 56 with the inner race ring of ball bearing Y4 while a fourth coupling element 58 operatively connects the ball retaining ring of ball bearing Y4 with a ring 60 press-fitted into the opening of the inner race ring of the ball bearing Y5 housed in a cup-shaped ring 61 threadedly engaging a screw-threaded portion at the free end of sleeve 53 as shown in Fig. 3. A nut 62 engages the cup-shaped ring 61 for forcing the outer ring of ball bearing Y5 against a peripheral ridge formed with a ring 63 in turn abutting against the outer race ring of ball bearing Y4 for collectively holding the spacer rings r3, r2 and r1 and the outer race rings of ball bearings Y3, Y2 and Y1 securely against movement relative to each other in the sleeve 53.

On the sleeve 53 is mounted a ball bearing 64 having two rows of balls L and L2, serving for rotatably mounting a hub member 65 secured to the outer race ring of this ball bearing by a nut ring 66 while to one end of hub 65 is secured as by a number of screws 68 a cover element 67 having a ridge 69 formed therewith fitted with a coupling ring 70 engaging the ball retaining ring of ball bearing Y5, thus cooperating with the coupling elements 55, 56, 57 and 58 for operatively connecting the armature shaft 52 of motor 51 to the hub 65 on ball bearing 64.

The hub 65 is provided with a flange portion 71 having a peripherally disposed shoulder portion 72 fitted with a drum 73 securely held on shoulder portion 72 by a ring 74 having a shoulder portion forced against the edge of the drum by the tightening of a plurality of nuts 75 on studs 76 laterally extending from the flange of drum 65, drum 73 being frictionally rotated at a speed of substantially 37 turns for each 2,997 revolutions of the armature shaft of motor 51.

In a typical example of operation of the speed reduction mechanism shown in Fig. 1 the rotation of armature shaft 33 of motor 32 at the assumed rate of 2,997 turns per minute is effective to rotate the shaft 29 and thereby the inner race ring of ball bearing B1. The operation of the inner ring of ball bearing B1 is imparted to its respectively associated ball retaining ring due to the planetary movement of the balls in that ring at a speed ratio of one turn for each three turns of inner race ring of ball bearing B1 or 999 turns for each 2,997 turns of the motor armature shaft, while the rotation of the ball retaining ring of bearing B1 is imparted to the inner race ring of ball bearing B2 and to its respectively associated ball retaining ring at a speed three times less than that of the inner race ring of the latter ball bearing or 333 turns per minute, the movement of the inner race of ball bearing B3 directly actuating the power take-off shaft 25 at the speed indicated by index R in registry with the mark 333 printed on dial D.

The longitudinal movement of shaft 25 in engagement with the inner race ring of ball bearings B4 or B5 will rotate the shaft at a speed of 111 and 37 revolutions for each 2,997 turns of motor shaft 33.

In this mechanism the disengagement of thumb screw 20 from the flange 18 of power take-off drum 17 and the engagement of thumb screw 37 with one of the holes 36 in disc 35 is effective to lock the shaft 25 and thereby the inner race ring of ball bearing B3 against rotation. The rotation of shaft 29 as above described is effective to rotate the inner race ring of ball bearing B1 and its ball retaining ring which in turn through its coupling element CE rotates the inner ring of ball bearing B2. The operation of this ring and the consequent rotation of the balls of this bearing, however, is ineffective to rotate their associated ball retaining ring due to the coupling element CE connecting with this ring being prevented from rotation by the shaft 25 which is now locked by thumb screw 37 as above described. Under this condition rotation of the inner ring of bearing B2 is effective to rotate the balls and thereby imparting rotation to the power take-off drum in a direction opposite to the direction of movement imparted to the shaft 25 for each selective movement of shaft 25 relative to the successive ball bearings B2, B3, B4 and B5.

In the operation of the modified speed reduction shown in Figs. 3 and 4 the operation of motor 51 at a speed of 2,997 revolutions per minute, for example, is effective to rotate the inner race ring of bearing Y1 which rotation is imparted to the ball retaining ring of this bearing at a reduced speed of 999 revolutions per minute and through the coupling element 55 to the inner race ring of bearing Y2 which in turn imparts movement to its associated ball retaining ring at the rate of 333 turns per minute. The rotation of this ball retaining ring through coupling 56 is effective to impart rotation to the ball retaining ring of this bearing at the rate of 111 turns for actuating its own ball retaining ring at the rate of 37 turns per minute while through the coupling element 58 rotation of the ball retaining ring of ball bearing Y4 is effective to rotate the ring 60 and thereby the inner race ring of ball bearing Y5 the rotation of which actuates the coupling ring 70 at a rate of 12+ revolutions per minute for rotating the drum 73 used, for example, to drive the magnetic tape in a sound recording and reproducing machine. Slipping at the last stage of speed reduction has been reduced to a minimum by the use of a ball bearing of a much greater diameter than that used for the first, second and third stages of speed reduction.

What is claimed is:

1. In a speed reduction mechanism, a rotatable drum, a plurality of pairs of concentrically disposed rings in said drum, a plurality of balls disposed between said rings in each of said pairs, rings having means for holding said balls in the annular spaces between said concentric rings, a plurality of coupling means for successively operatively connecting the ball retaining rings of said bearings to similar successive rings in said pairs of concentric rings, a driven shaft movable longitudinally for individually engaging said similar rings, a locking mechanism for holding said shaft from rotation to cause the movement of said drum in one direction, and a locking mechanism for locking said drum to cause the operation of said shaft in another direction upon the unlocking of the latter by the first-mentioned locking mechanism.

2. In a speed reduction mechanism, a rotatable drum, a plurality of pairs of concentrically disposed rings in said drum, a plurality of balls disposed in the annular space between said rings in each of said pairs, rings having means for holding said balls between said concentric rings, a plurality of coupling means for successively operatively connecting the ball retaining rings of said bearings to similar successive rings in said pairs of concentric rings, a power take-off shaft movable longitudinally for successively engaging means carried thereby with means in said similar rings, for rotation according to the engaged ring a manually operable locking mechanism for holding said shaft from rotation to cause the rotating movement of said drum in one direction at predetermined speeds, a locking mechanism for holding said drum from rotation to cause the operation of said shaft in a direction opposite to the direction of rotation of said drum following the manual operation of the unlocking of said shaft by the first-mentioned locking mechanism.

3. In a speed reduction mechanism a rotatable drum, a plurality of pairs of concentrically disposed rings in said drum, a plurality of balls disposed in the annular space between said rings in each of said pairs, rings having means for holding said balls in the annular spaces, a plurality of coupling means for successively operatively connecting the ball retaining rings of said bearings to similar successive rings in said pairs of concentric rings, a power take-off shaft movable longitudinally for engaging means in said similar rings, a locking mechanism for holding said shaft from rotation to cause the movement of said drum in one direction at a predetermined speed, a mechanism for locking said drum to cause the operation of said shaft in a direction opposite to said drum at another speed upon the unlocking of said shaft by the first-mentioned lock mechanism, a scale, means carried by said shaft cooperating with said scale for indicating the successive speeds of said shaft, and another power take-off shaft element carried by said drum.

JOHN B. LITTLE.
WILDEN A. MUNSON.

REFERENCES CITED

The following references are of record in the file of this patent:

UNITED STATES PATENTS

| Number | Name | Date |
|---|---|---|
| 1,058,275 | Torday | Apr. 8, 1913 |
| 1,201,364 | Shelton | Oct. 17, 1916 |
| 1,201,367 | Shelton | Oct. 17, 1916 |
| 1,256,175 | Shelton | Feb. 12, 1918 |
| 1,986,177 | Fastoupil | Jan. 1, 1935 |

FOREIGN PATENTS

| Number | Country | Date |
|---|---|---|
| 17,547 | Great Britain | Dec. 15, 1915 |